United States Patent
Kato et al.

[11] 3,841,067
[45] Oct. 15, 1974

[54] ELECTRIC VACUUM CLEANER
[75] Inventors: Satoru Kato; Isamu Tayama, both of Ojima-machi, Japan
[73] Assignee: Mitsubishi Denki Kabushiki Kaisha, Tokyo, Japan
[22] Filed: Sept. 4, 1973
[21] Appl. No.: 394,112

[30] Foreign Application Priority Data
Sept. 5, 1972   Japan............................. 47-102956

[52] U.S. Cl................ 55/300, 15/327 D, 15/327 E, 15/352, 55/472, 55/498
[51] Int. Cl........................................... B01d 46/04
[58] Field of Search............................ 55/295–300, 55/304, 305, 467, 470, 471–473, 498; 15/327 D, 327 E, 327 R, 352

[56] References Cited
UNITED STATES PATENTS

| | | | |
|---|---|---|---|
| 2,648,396 | 8/1953 | Kirby | 15/327 R |
| 2,713,921 | 7/1955 | Turner | 55/296 |
| 3,591,888 | 7/1971 | Chuji Takeda et al. | 15/352 |

Primary Examiner—Bernard Nozick
Attorney, Agent, or Firm—Wenderoth, Lind & Ponack

[57] ABSTRACT

The disclosed electric cleaner includes a filter drum produced by shaping a corrugated piece of fine filter sheet into a hollow, general circular cylinder, and a dusting unit disposed within the drum. The dusting unit includes one vibratile strip radially disposed in each wave on the corrugated piece and a coiled member rotatable about the longitudinal axis of the drum to successively flip the vibratile strips to vibrate the filter drum. Alternatively the dusting unit may include a beater movable along the filter axis to resiliently impart an impulse to the filter drum to vibrate it and a striker rotatable about the filter axis to strike the radially innermost portion of the drum.

3 Claims, 4 Drawing Figures

3,841,067

ELECTRIC VACUUM CLEANER

BACKGROUND OF THE INVENTION

This invention relates to an electric cleaner device comprising a main body including an electrically operated blower and a filter for removing dust particles contained in a stream of air sucked into the main body through the rotational movement of the blower. More particularly the invention relates to improvements in such a filter and dusting means suitable for use with the improved filter.

Conventional filters for use with electric cleaner devices have been generally formed of textile or unwoven or fabric or paper permeable to air or the like. If it is desired to increase the filtration area of the filter to increase the filtration efficiency thereof, then only an increase in the dimension of the filter itself inevitably leads to an increase in dimension of the main body of the electric cleaner itself because the electric cleaner has a limitation as to the internal space. Thus this measure has not been so desirable. Alternatively at has been already proposed to corrugate filter paper or fabric thereby to increase the filtration area without increasing the space occupied by the filter. In the latter event, it has been difficult to retain the corrugation as formed because materials used to construct the filter are relative soft and lack firmness. This has resulted in the necessity of separately using means for retaining the corrugation of filters. The means for retaining the corrugation of filters. The means for retaining the corrugation has required an additional space occupied thereby with the result that the main body of the electric cleaner becomes inevitably large-sized. In addition, filters of the type as above described generally include dusting means for removing dust particles adhering thereto which also require a further space occupied thereby.

SUMMARY OF THE INVENTION

Accordingly, it is an object of the present invention to provide a new and improved electric cleaner device increased in filtration area while decreasing in space occupied by a filter involved and including a dusting means for removing dust particles adhering to the filtration surface of the filter, disposed so as not to require an additional space occupied thereby whereby the device is compact in construction.

The present invention accomplishes this object by the provision of an electric cleaner device comprising, in combination, a main body including a suction port and an exhaust port and having an electrically operated blower disposed therein, filter means disposed in the main body to filter out dust particles contained in a stream of air sucked into the main body through the suction portion during the operation of electrically operated blower, the filter means including a filter drum produced by folding a flat piece of fine filter sheet into which a fibrous material is formed, into a plurality of continuous waves and then shaping the corrugated piece of filter sheet into a hollow, general circular cylinder, and dusting means disposed in the interior of the filter drum to remove dust particles adhering to the filtration surface thereof.

The dusting means may preferably include a plurality of rectangular vibratile strips radially disposed within the filter drum one for each wave so that the vibratile strip has the radially outermost edge abutting against the associated wave valley as viewed internally of the filter drum and the radially innermost edge radially projecting beyond the associated wave crest as viewed internally of the filter element, and a dusting resilient member within the filter drum rotatable about the longitudinal axis of the filter drum, the dusting member being capable of flipping the radially innermost edge of each vibratile strip during the rotational movement thereof.

BRIEF DESCRIPTION OF THE DRAWINGS

The present invention will become more apparent from the following detailed description taken in conjunction with the accompanying drawings in which.

DESCRIPTION OF THE PREFERRED EMBODIMENTS

Figure 1:
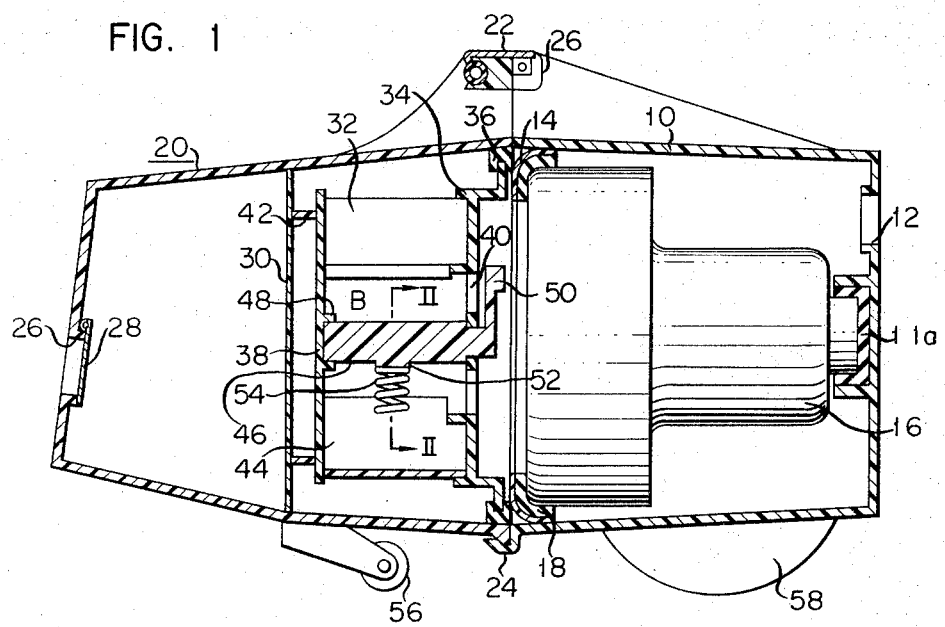
FIG. 1 is a side elevational view, partly in longitudinal section of an electric cleaner device constructed in accordance with the principles of the present invention.

Referring now to the drawings and FIG. 1 in particular, it is seen that an arrangement disclosed herein comprises a housing general designated by the reference numeral 10 and including a front end open, a rear end provided with an exhaust port 12, a supporting frame member 14 firmly fitted into the front open end, and an electrically operated blower 16 fixedly disposed between the supporting frame member 14 and the rear end through packings 18, 18a for example rubber vibration insulators. The housing 10 is detachably engaged by a dust collector casing generally designated by the reference numeral 20 by having a latch 22 connected to a porter handle 24 and disposed on the uppermost portion of the front housing end and a hook 24 disposed on the lowermost portion of the front housing end. The housing 10 forms and enclosure for a main body A of an electric cleaner device with the dust collector casing 20.

Figure 2:
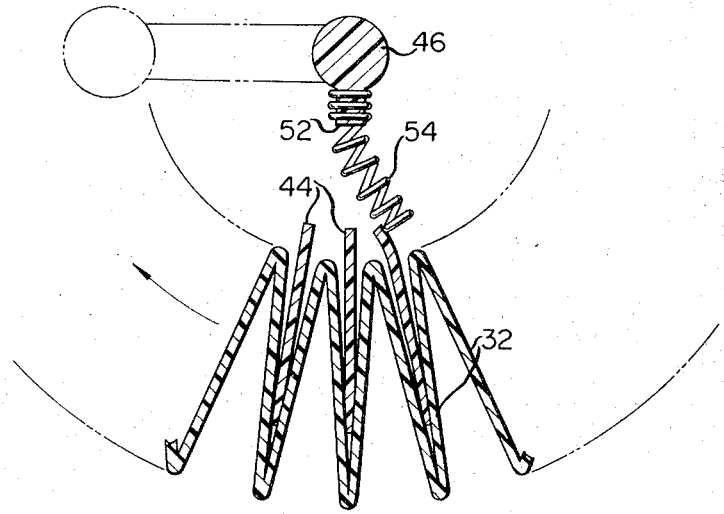
FIG. 2 is a fragmental cross sectional view taken along the line 11—11 of FIG. 1.

The dust collector casing 20 comprises front end provided with a suction port 26 including a check valve 28, and a rear end open. The suction port 26 is adapted to be connected to a suction hose (not shown) and the check valve 28 serves to prevent dust particles accumulated in the dust collector casing 20 from emerging from the suction port 26 in the exterior of the chasing 20 upon disengaging the suction hose from the suction port 26. The dust collector casing 20 further has filter unit B detachably disposed therein. The filter unit B includes a pre-filter 30 of relative coarse mesh located at its position near to the suction port 26 and a fine filter drum 32 located in the rear of the pre-filter 30 or at its position near to the suction side of the electrically operated blower 16. The pre-filter 30 serves to filter out coarse dust particles and the fine filter drum 32 serves to filter out fine dust particles. To prepare the filter drum 32, a flat piece of filter sheet produced by forming any suitable fibrous material, for example, filter paper is first folded into a plurality of continuous waves and then shaped into a hollow, general circularly cylinder as shown in FIG. 2. That is, the filter drum 32 includes a plurality of tapered radial protrusions disposed at substantially equal angular internals and a central space in the form of a circular cylinder as defined by the radially innermost ends of the protrusions. Then the filter drum 32 is hermetically secured on one end face to a supporting plate 34 of any suitable plastic hermetically fitted into the rear open end of the casing 20 through an annular packing 36 and on the other end face to an end plate of any suitable plastic. The supporting plate 34 includes a plurality of vent openings 40. In order to retain the desired configuration of the filter drum 32. the supporting plate 34 includes preferably a protruberence (not shown) disposed on that surface contacting the filter drum so as to correspond in position to and be complementary in outer profile to the filter drum 34. When in its assembled position, the end plate 38 also serves to push against an annular protrusion 42 on the pre-filter 30 to maintain the latter in place within the dust collector casing 20.

Thus it will be appreciated that the blower 16 is operated to produce an air stream from the suction port 26 passing through the pre-filter 30, and then flowing from the outer to the inner surface of the fine filter drum 32 within the main body A. Dust particles are sucked into the main body A by means of this air stream until coarse dust particles are caught by the prefilter 30 while those fine dust particles passed through the pre-filter 30 are caught by the filter drum 32.

As shown in FIG. 2, the filter drum 32 in the form of a hollow, general circularly cylinder has one rectangular vibratile strip 44 radially disposed in each wave thereof so that the strip 44 abuts at the radially outermost edge against the associated wave valley as viewed internally of the filter drum and has the radially innermost edge radially projecting slightly beyond the associated wave crest as viewed internally of the filter. In order to remove fine dust particles adhering to the outer surface of the filter drum 32, a rotatable shaft 46 is disposed on the longitudinal axis of the filter drum 32 by having one end supported to a journal 48 on the end plate 38 and the other end portion reduced in diameter and rotatably extending through the supporting plate 34. Also the rotatable shaft 46 is provided at the reduced end projecting beyond the supporting plate 34 with a handle 50 and adjacent the middle portion with a radial protrusion 52. A resilient element 54 in the form of a helical coil is attached at one end to the radial protrusion 52 and dimensioned so that the other end thereof can abuts against the radially innermost end portion of each vibratile strip 44.

The main body A includes wheels 52 and 54 secured to the lowermost portions of the housing and dust collector casing 10 and 20 respectively in order to facilitate the movement of the main body A.

The arrangement as above described is operated as follows: With a suction hose (not shown) connected to the suction port 26, the electrically operated blower 16 is operated to suck the air into the interior of the main body A through the suction port 26. Dust particles contained in an air stream thus formed passes to the pre-filter screen 30 which, in turn, filters out coarse dust particles and permits fine dust particles to pass therethrough. The fine dust particles passed through the pre-filter screen 30 along with the air stream flows to the filter unit B. The filter drum 32 permits the air stream to pass therethrough and prevent the fine dust particles from passing therethrough. At least some of the fine particles will adhere to the outer filtration surface of the filter 32. The air stream flowing into the filter drum 32 passes through the vent openings 40 on the supporting plate 34 and thence to the interior of the housing 10 until it is exhausted to the atmosphere through the exhaust port 12.

When a substantial amount of dust has been accumulated in the dust collector casing 20, the latch 22 can be released to disengage the dust collector casing 20 from the housing 10. At that time the handle 50 is accessible. Then the handle 50 is manually operated to rotate the shaft 46 and therefore the coiled resilient member 54. During the rotational movement of the resilient member 54, for example, in the direction of the arrow shown in FIG. 2, the free end thereof successively passes over the radially innermost ends of the vibratile strips 42. Each time the resilient member 54 passes over one vibratile strip 54, the latter vibrates due to its own resilience, and simultaneously strikes the adjacent surface of the associated wave portion to vibrate it until the filter drum 32 as a whole vibrates. The vibration of the filter drum causes the fine dust particles adhering to the outer surface thereof to be removed. Thereafter the filter supporting plate 34 is manually removed from the dust collector casing 20 resulting in the simultaneous removal of the filter drum 32 from the dust collector casing 20. Then the pre-filter screen 32 can be similarly removed from the casing to put the rear end portion of the casing 20 in its open state. Dust particles accumulated in the casing 20 can be now dumped in a suitable place.

Figure 3:
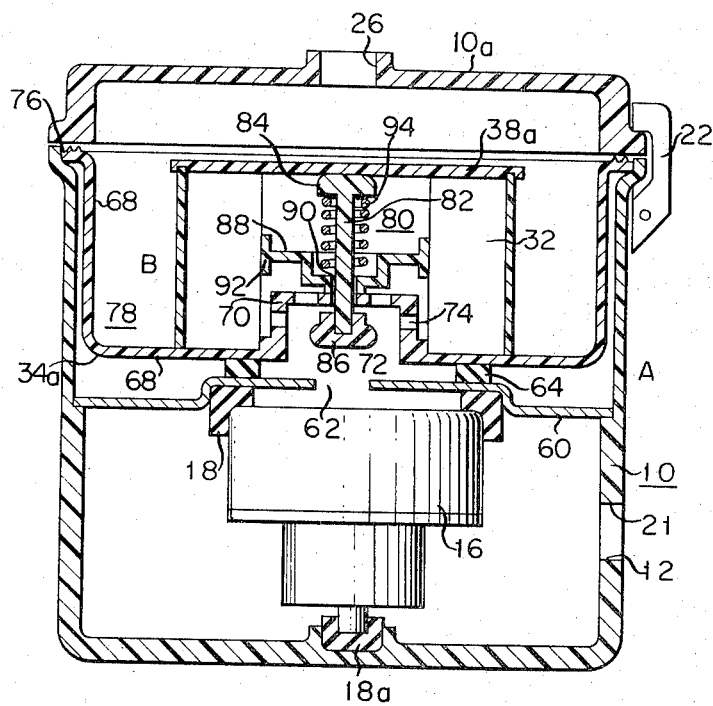
FIG. 3 is a view similar to FIG. 1 but illustrating a modification of the present invention.

In FIG. 3, wherein like reference numerals designate the components identical or similar to those shown in FIG. 1, there is shown a modification of the present invention. Unlike the arrangement of FIG. 1, wherein the filter unit B is disposed on the left of the blower 16 within the main body, the arrangement illustrated comprises a filter unit is disposed above an electrically operated blower within the main body. MOre specifically a housing 10 includes an open top, an exhaust port 12 disposed on the lower portion of the side wall thereof. The open top of the housing 10 is closed with a cover member 10a in the form of an inverted cup provided with a central suction port 26. The cover member 10a detachably engages the housing 10 by means of a latch 22 to form an enclosure for a main body A. A partition 60 includes a central vent opening 62 and traverses the interior of the housing 10 at a level higher than that of the exhaust port 12 to divide it into an upper and a lower portion.

On the upper portion of the housing 10 an electrically operated blower 16 is disposed between the bottom of the housing 10 and the partition 60 through packings 18 and 18a while on the upper portion thereof a filter unit B is suspended to an annular flange defining the open top of the housing 10 as will be described hereinafter with an annular packing 64 interposed the same and the partition 60. The packing 64 acts to prevent an air stream from the leaking through a spacing between the bottom of the filter unit and the partition 60.

The filter unit B includes the filter drum 32 as shown in FIGS. 1 and 2 hermetically fixed at one end to an end plate 38a similar to the end plate 38 as shown in FIG. 1 except for the omission of the journal 48 and at the other end to a supporting plate 34. The supporting plate 34 of any suitable synthetic resin includes a lateral wall 66 in the form of an annulus surrounding in spaced relationship the filter drum 32 and a bottom wall 68 with a central portion 70 bulged into the central cylindrical space in the filter drum 32. The bulged portion 70 includes a central hole 72 and a plurality of vent holes 74 disposed around the central hole 72. The lateral wall 66 is provided at the free edge with an outwardly directed flange 76 with projections rested on the annular flange disposed at the top of the housing 10. An annular space 78 is formed between the lateral support wall 66 and the filter drum 32 to accumulate dust particles therein.

With the cover member 10a engaged by the housing 10, the cover member 10a downwardly pushes the projections on the flange 76 and therefore the supporting plate 60 to maintain both the filter unit B and the blower 16 in place within the housing 10. With the cover member 10a removed from the housing 10, the filter unit B can be manually removed from the housing 10.

Figure 4:
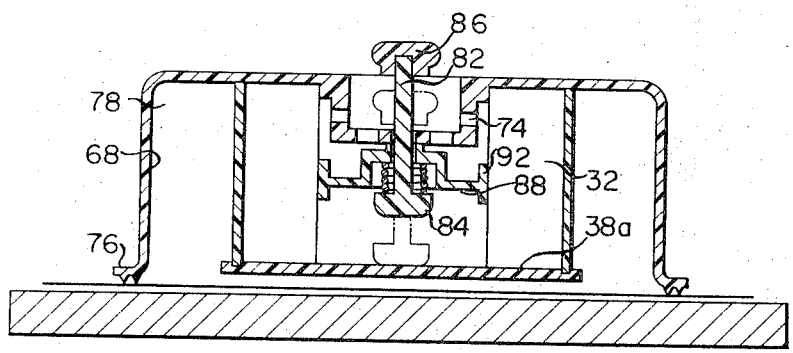
FIG. 4 is a longitudinal sectional view of the dusting means of FIG. 3 illustrated at its position ready for operation.

In FIG. 4, a dusting unit is shown as being disposed in the central cylindrical space in the filter drum 32 and generally designated by the reference numeral 80. The dusting unit 80 comprises a main dusting rod 82 in the form of a prism extending through the central hole 72 on the supporting plate 34 for rotational and sliding movements and having a beater 84 and a knob 86 attached to the upper and lower ends thereof respectively. An auxiliary dusting rod 88 is located upon the bulged portion 70 of the supporting plate 34a and includes a central hole 90 complementary in shape to the main rod 82 to permit the latter to slide therealong but to prevent it from rotating with respect to the same and a pair of strikers 92 attached to both ends thereof at such positions that, when the auxiliary rod 88 is rotating simultaneously with the main rod 82, the both strikers 92 successively collide with the radially innermost portions of the waves on the filter drum 32. A compression spring 94 is disposed around the main rod 82 between the beater 94 and the auxiliary rod 88 to normally contact the beater 84 with the end plate 38a.

In operation the electrically operated blower is operated to suck the air and dust particles into the main body A through the suction port 26. The dust particles are blocked by the filter drum 32 while a stream of air sucked passes through the filter drum 32. Then the air stream is passed through holes 74 and 62 and then exhausted from the main body through the exhaust port 12.

After a substantial amount of dust has been accumulated in the annular space 78 and/or after the filter drum 32 has been clogged with dust particles, the cover member 10a is removed from the housing 10 with the latch 22 released. Then dust particles accumulated in the space 78 are dumped after which the filter unit B can be removed from the housing provided that the filter drum has been clogged with dust particles. The filter unit B thus removed is put upside down on a suitable piece of paper as shown in FIG. 4. Then the knob 86 is manually raised against the action of the compression spring 94 followed by the release of the knob 86. This causes the beater 84 to strongly strike on the end plate 38a thereby to vibrate it and hence the filter drum 32 resulting in the removal of dust particles from the filter drum. The process as above described is repeated until the filter drum 32 is substantially free from dust. Also the knob 80 can be manually rotated to rotate the main rod 27 and therefore the auxiliary rod 88. This causes the strikers 92 to successively flip the radially innermost portions of the waves on the filter drum 32 to vibrate the latter thereby to remove those dust particles adhering to the filtration surface thereof.

From the foregoing it will be appreciated that the present invention provides an electric cleaner device increased in a filtration area of a filter within a range as determined by a given internal volume of main cleaner body. Further the present device becomes compact in construction because the dusting unit is disposed within the filter drum.

While the present invention has been illustrated and described in conjunction with a few preferred embodiments thereof it is to be understood that numerous changes and modifications may be resorted to without departing from the spirit and scope of the invention.

What we claim is:

1. An electric cleaner device comprising, in combination, a main body including a suction port and an exhaust port and having an electrically operated blower disposed therein, filter means disposed in said main body to filter out dust particles contained in a stream of air sucked into the main body during the operation of said electrically operated blower, said filter means including a filter drum closed at one end and open at the other communicating with the blower produced by foldtinuous waves and then shaping the corrugated piece of filter sheet into a hollow, general circular cylinder, said filter sheet being prepared by forming a fibrous material, and dusting means disposed within the interior of said filter drum to vibrate the filter and remove dust particles adhering to the filtration surface of said filter drum.

2. An electric cleaner device as claimed in claim 1, wherein said dusting means includes a plurality of rectangular vibratile strips radially disposed within said filter drum one for each wave so that the vibratile strip has a radially outermost edge abutting against the associated wave valley as viewed internally of the filter drum and a radially innermost edge radially projecting beyond the associated wave crest as viewed internally of the filter drum, and a dusting resilient member within said filter drum rotatable about the longitudinal axis of the filter drum, said dusting member being capable of successively flipping said radially innermost edges of said vibratile strips during the rotational movement thereof.

3. An electric cleaner device as claimed in claim 1, wherein said dusting means includes a spring loaded beater within said filter drum movable along the longitudinal axis of the filter drum to resiliently impart an impulse to said filter drum and a striker rotatable about the longitudinal axis of the filter drum to successively strike the radially innermost portions of said filter drum.

* * * * *